United States Patent
Qi

(10) Patent No.: US 7,471,664 B2
(45) Date of Patent: Dec. 30, 2008

(54) NETWORK MANAGEMENT POLICY AND COMPLIANCE IN A WIRELESS NETWORK

(75) Inventor: Emily H. Qi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 401 days.

(21) Appl. No.: 11/266,050

(22) Filed: Nov. 2, 2005

(65) Prior Publication Data

US 2007/0097896 A1    May 3, 2007

(51) Int. Cl.
 H04Q 7/24 (2006.01)
 H04B 7/216 (2006.01)
 H04B 7/00 (2006.01)
(52) U.S. Cl. ................... 370/338; 370/310; 370/342
(58) Field of Classification Search ......... 370/310, 370/338, 342, 395.21; 709/220, 223
 See application file for complete search history.

(56) References Cited

U.S. PATENT DOCUMENTS

| | | | |
|---|---|---|---|
| 6,154,778 A * | 11/2000 | Koistinen et al. | 709/228 |
| 6,950,669 B2 * | 9/2005 | Simonsson | 455/522 |
| 7,076,552 B2 * | 7/2006 | Mandato | 709/226 |
| 7,095,754 B2 * | 8/2006 | Benveniste | 370/465 |
| 7,185,070 B2 * | 2/2007 | Paul et al. | 709/220 |
| 7,209,437 B1 * | 4/2007 | Hodgkinson et al. | 370/230 |
| 7,219,354 B1 * | 5/2007 | Huang et al. | 719/328 |
| 7,313,237 B2 * | 12/2007 | Bahl et al. | 380/44 |
| 2004/0103282 A1 * | 5/2004 | Meier et al. | 713/171 |
| 2006/0114855 A1 * | 6/2006 | Zheng | 370/331 |
| 2007/0201366 A1 * | 8/2007 | Liu | 370/235 |

* cited by examiner

Primary Examiner—Lester Kincaid
Assistant Examiner—Nathan Mitchell
(74) Attorney, Agent, or Firm—Alan Pedersen-Giles

(57) ABSTRACT

In some embodiments of a wireless network an access point may describe its manageability policy in a beacon or probe response, a receiving mobile device may describe its manageability policy in a communication back the to access point, and the access point may communicate a joint manageability policy back to the mobile device describing the manageability followed in subsequent communications between the two devices. In some embodiments some of the communications may be part of a communications sequence for association or re-association of the mobile device and access point.

31 Claims, 2 Drawing Sheets

NETWORK MANAGEMENT POLICY AND COMPLIANCE IN A WIRELESS NETWORK

BACKGROUND

Wireless Network Management (WNM) messages are intended to manage network operations by controlling, or at least influencing, communications between a wireless access point (AP) and various wireless mobile devices (STAs). However, under conventional standards, each STA or AP may decide for itself whether to interpret a WNM message as a command message, an advisory message, or an irrelevant message. Such inconsistent interpretation can cause confusion and inefficiency in the network.

BRIEF DESCRIPTON OF THE DRAWINGS

Some embodiments of the invention may be understood by referring to the following description and accompanying drawings that are used to illustrate embodiments of the invention. In the drawings.

DETAILED DESCRIPTION

Figure 1:
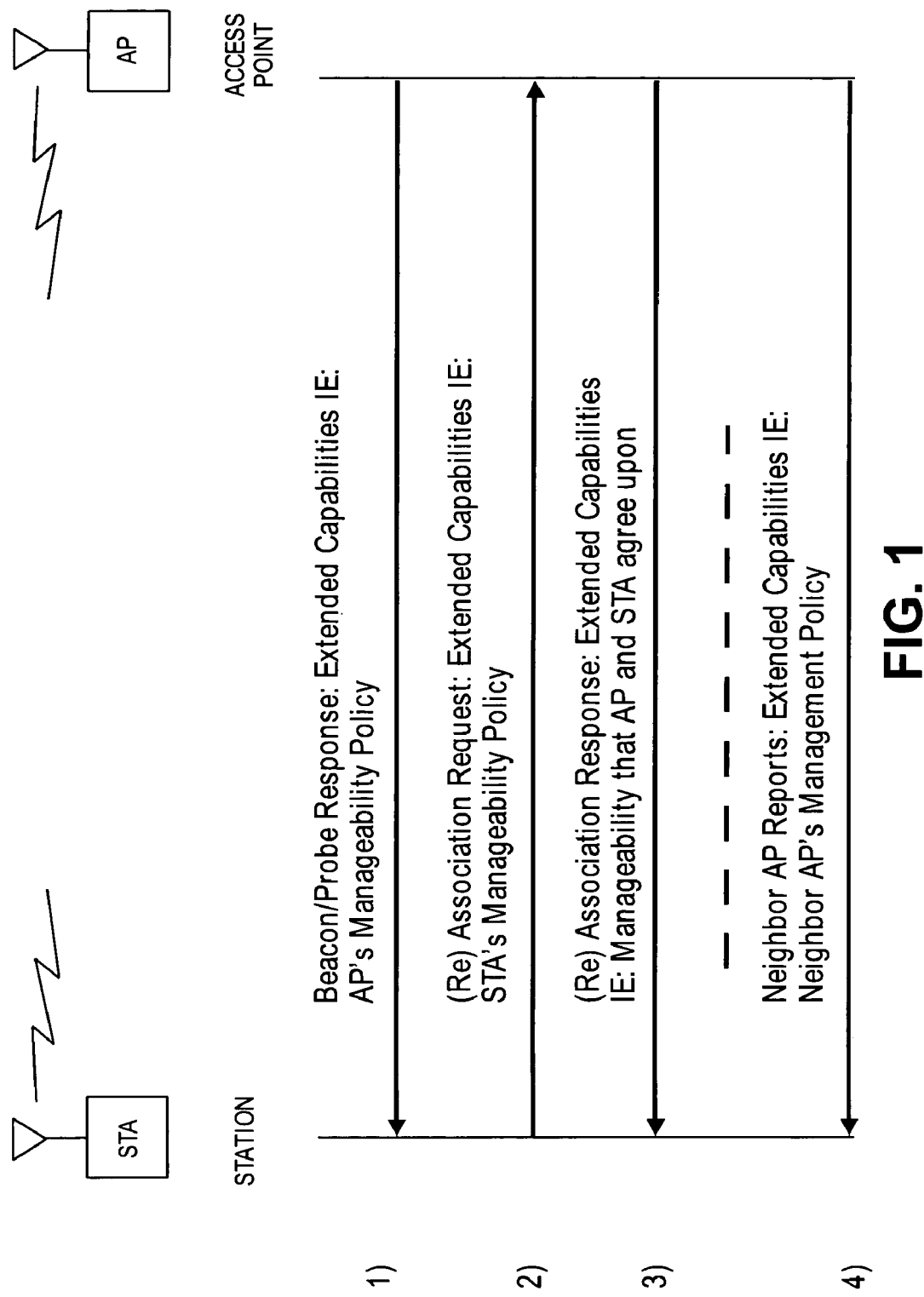
FIG. 1 shows a diagram of an exchange of messages regarding manageability policy, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements co-operate or interact with each other, but they may or may not be in direct physical or electrical contact.

The term "processor" may refer to any device or portion of a device that processes electronic data from registers and/or memory to transform that electronic data into other electronic data that may be stored in registers and/or memory. A "computing platform" may comprise one or more processors.

The term "wireless" may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The term "mobile wireless device" may be used to describe a wireless device that may be moved while it is communicating.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Various embodiments of the invention may be implemented in one or any combination of hardware, firmware, and software. The invention may also be implemented as instructions contained in or on a machine-readable medium, which may be read and executed by one or more processors to perform the operations described herein. A machine-readable medium may include any mechanism for storing, transmitting, and/or receiving information in a form readable by a machine (e.g., a computer). For example, a machine-readable medium may include a storage medium, such as but not limited to read only memory (ROM); random access memory (RAM); magnetic disk storage media; optical storage media; flash memory devices. A machine-readable medium may also include a tangible medium through which electrical, optical, acoustical or other form of propagated signals representing the instructions may pass, such as antennas, optical fibers, communications interfaces, and others.

Various embodiments of the invention may result in an agreement between an AP and a STA as to what manageability policy will be followed in communications between those two devices. The AP may advertise its capability and its policy, and the STA may indicate what it is willing to accept and/or what it is not. In some cases, if the STA's policy does not meet the minimum requirements of the AP, this negotiation may result in a rejection of the association between the two devices. Within the context of this document, a manageability policy may comprise a list of various types of manageability services, with a value for each that indicates whether a control message pertaining to that service may be interpreted as a mandatory command, or may be interpreted as an optional recommendation, or may not be supported at all.

FIG. 1 shows a diagram of an exchange of messages regarding manageability policy, according to an embodiment of the invention. In some operations the exchange may begin when the AP (shown with at least one antenna, such as, for example, a dipole antenna) wirelessly transmits a beacon, alerting any unassociated STAs in its area that the AP is there. Alternately, the AP may respond to a probe (not shown) from a particular STA that is searching for an AP to associate with. In either case, the beacon/probe response may contain, among other things, information describing the AP's manageability policy (e.g., the manageability functions it is able and/or willing to support), as shown on line 1) of FIG. 1. As shown on line 2), the STA (also shown with at least one antenna, such as, for example, a dipole antenna) may wirelessly transmit an association request (or alternately, a re-association request) that may contain, among other things, information on its own manageability policy. As shown on line 3), the AP may then wirelessly transmit an association response (or alternately, a re-association response) that may contain, among other things, the manageability policy that will be followed in the subsequent association between this AP and this STA, based on the information in the previous two transmissions. In many cases this resulting manageability policy may be a subset of the AP's capabilities that were advertised on line 1), based on what the STA is capable of or willing to support as described o line 2). In some cases, the AP may have requirements that the STA is unable or unwilling to meet, and the AP may refuse, in the (re)association response, the STA's request for (re)association. The exact determination of how to form an agreed-upon policy, or how to decide to accept/reject the request any feasible manner. In other embodiments, the AP and STA may form an association first, go through the policy negotiation during the association using another set of message exchanges, and then the AP may cancel the association if the STA cannot meet the AP's requirements.

In some embodiments the manageability policy may be described in an Extended Capability Information Element (Extended Capability E), but other embodiments may place this information in other locations. In some embodiments both the AP and the STA will use the same format to describe the respective manageability policies and resulting agreement, but other embodiments may use different formats for one or more of these.

In some embodiments, the AP may wirelessly transmit Neighbor AP Reports describing neighboring AP's that the STA's may wish to associate with, due to roaming, traffic congestion on the current AP, etc. As shown on line 4) of FIG. 1, these Neighbor AP Reports may include the manageability policy of each neighbor AP, so that the STA associated with the current AP may make an informed decision about trying to subsequently associate with the neighbor AP.

Figure 2:
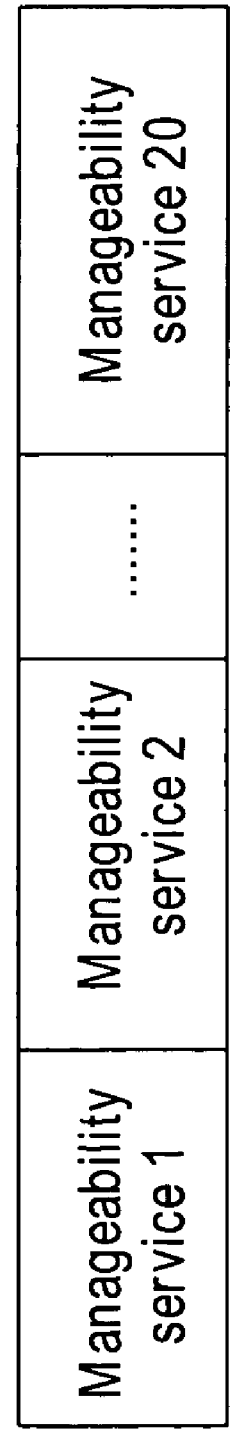
FIG. 2 shows a diagram of a format for describing the manageability services that make up a manageability policy, according to an embodiment of the invention.

FIG. 2 shows a diagram of a format for describing the manageability services that make up a manageability policy, according to an embodiment of the invention. The example shows 20 manageability services, with 2 bits to describe each one, but other embodiments may have other quantities of either/both of these parameters. In some embodiments the position of each particular service in this sequence may be predefined, but in other embodiments each service may be labeled to indicate what service is represented in each position. The meaning of each value may be predefined. In the example shown, a value of "00" for a particular service may indicate that service will not be supported in the subsequent association. A value of "01" may indicate that service will be supported as an 'advisory' (e.g., the service is recommended, but the STA may decide whether to follow that recommendation). A value of "10" may indicate that service will be supported as a 'strong advisory' (e.g., the service is a strong recommendation that the STA should follow, absent a good reason not to). A value of "11" may indicate that service will be supported as a 'command' (e.g., the STA has to do what the AP specifies, or disassociation or interrupted service may be enforced). In some embodiments, a given value may include not only the indicated level, but also any lesser supported levels (e.g., a "11" may encompass not only 'command', but also 'strong advisory' and 'advisory', while a "10" may encompass both 'strong advisory' and 'advisory'). In some embodiments this same format may be followed in each of the three messages in which the policies are described, but in other embodiments a different format may be used in each message. In subsequent communications, when a control message is sent it may include an indicator as to whether it is a 'command', 'strong advisory', or 'advisory' control message (within the limits of the agreed-upon policy), and the receiving STA may follow that indication. For example, the joint (final) policy may indicate that AP Load Balancing is a '11'. If the AP subsequently sends an AP Load Balancing control message to the STA that is labeled as a 'command', the STA must switch to another AP. But if the AP Load Balancing control message to the STA is labeled as an 'advisory' or 'strong advisory', the STA may decide whether or not to switch to another AP.

The various categories of manageability services that are handled in this manner may vary, depending on various factors. However, some embodiments may include one or more of the following as manageability services: 1) dynamic channel selection, 2) power saving, 3) firmware upgrade, 4) load balancing, 5) deferral management, 6) access point coordination, 7) transmit power control, 8) contention notification, 9) diagnostics, 10) advanced antennas; and 11) location identification.

The foregoing description is intended to be illustrative and not limiting. Variations will occur to those of skill in the art. Those variations are intended to be included in the various embodiments of the invention, which are limited only by the spirit and scope of the following claims.

What is claimed is:

1. A method, comprising:
transmitting, from a first wireless device to a second wireless device, a first message including information, including a first list of different manageability services and data indicating whether control messages associated with the different manageability services in the first list are mandatory, optional, or not supported, describing a manageability policy of the first wireless device;
receiving, by the first wireless device from the second wireless device, a second message including information, including a second list of different manageability services and data indicating whether control messages associated with the different manageability services in the second list are mandatory, optional, or not supported, describing a manageability policy of the second wireless device; and
transmitting, from the first wireless device to the second wireless device, a third message including information, including a third list of different manageability services and data indicating whether control messages associated with the different manageability services in the third list are mandatory, optional, or not supported, describing a joint manageability policy to be followed in subsequent communications between the first and second wireless devices.

2. The method of claim 1, wherein said transmitting the first message occurs prior to forming an association between the first and second wireless devices.

3. The method of claim 1, wherein the joint manageability policy comprises indicators of which of multiple manageability services are supported.

4. The method of claim 3, wherein the indicators comprise indicators of which manageability services may be interpreted as commands and which manageability services may be interpreted as unsupported.

5. The method of claim 3, wherein the manageability services comprise at least one manageability service selected from the list consisting of:
dynamic channel selection;
power saving;
firmware upgrade;
load balancing;
deferral management;
transmit power control;
virtual access points;
contention notification;
diagnostics;
advanced antennas; and
location identification.

6. The method of claim 1, further comprising transmitting, from the first wireless device to the second wireless device, a fourth message including information describing a manageability policy of a third wireless device.

7. A method, comprising:
receiving, by a first wireless device from a second wireless device, a first message including information, including a first list of different manageability services and data indicating whether control messages associated with the different manageability services in the first list are mandatory, optional, or not supported, describing a manageability policy of the second wireless device;
transmitting, from the first wireless device to the second wireless device, a second message including information, including a second list of different manageability services and data indicating whether control messages associated with the different manageability services in the second list are mandatory, optional, or not supported, describing a manageability policy of the first wireless device; and
receiving, by the first wireless device from the second wireless device, a third message including information, including a third list of different manageability services and data indicating whether control messages associated with the different manageability services in the third list are mandatory, optional, or not supported, describing a joint manageability policy to be followed in subsequent communications between the first and second wireless devices.

8. The method of claim 7, wherein the first message comprises either a beacon or a probe response.

9. The method of claim 7, wherein the second message comprises either an association request or a re-association request.

10. The method of claim 7, wherein the third message comprises either an association response or a re-association response.

11. The method of claim 7, wherein the joint manageability policy comprises indicators of whether each of multiple management services are to be supported.

12. An apparatus, comprising
a first wireless device to:
transmit a first message, including a first list of different manageability services and data indicating whether control messages associated with the different manageability services in the first list are mandatory, optional, or not supported, describing a manageability policy of the first wireless device;
receive a second message, including a second list of different manageability services and data indicating whether control messages associated with the different manageability services in the second list are mandatory, optional, or not supported, describing a manageability policy of a second wireless device;
transmit a third message, including a third list of different manageability services and data indicating whether control messages associated with the different manageability services in the third list are mandatory, optional, or not supported, describing a joint manageability policy to be followed in subsequent communications between the first and second wireless devices.

13. The apparatus of claim 12, wherein the second message is to include an association request.

14. The apparatus of claim 12, wherein the third message is to include an association response.

15. The apparatus of claim 12, further comprising a dipole antenna coupled to the first wireless device.

16. An apparatus, comprising
a first wireless device to:
receive a first message, including a first list of different manageability services and data indicating whether control messages associated with the different manageability services in the first list are mandatory, optional, or not supported, from a second wireless device describing a manageability policy of the second wireless device;
transmit a second message, including a second list of different manageability services and data indicating whether control messages associated with the different manageability services in the second list are mandatory, optional, or not supported, to the second wireless device describing a manageability policy of the first wireless device;
receive a third message, including a third list of different manageability services and data indicating whether control messages associated with the different manageability services in the third list are mandatory, optional, or not supported, from the second wireless device describing a joint manageability policy to be followed in subsequent communications between the first and second wireless devices.

17. The apparatus of claim 16, wherein the first wireless device is a mobile wireless device.

18. The apparatus of claim 16, wherein the second wireless device is an access point.

19. The apparatus of claim 16, further comprising a dipole antenna coupled to the first wireless device.

20. An article comprising
a machine-readable medium that contains instructions, which when executed by at least one machine result in performing operations comprising:
transmitting, from a first wireless device to a second wireless device, a first message including information, including a first list of different manageability services and data indicating whether control messages associated with the different manageability services in the first list are mandatory, optional, or not supported, describing a manageability policy of the first wireless device;
receiving, by the first wireless device from the second wireless device, a second message including information, including a second list of different manageability services and data indicating whether control messages associated with the different manageability services in the second list are mandatory, optional, or not supported, describing a manageability policy of the second wireless device; and
transmitting, from the first wireless device to the second wireless device, a third message including information, including a third list of different manageability services and data indicating whether control messages associated with the different manageability services in the third list are mandatory, optional, or not supported, describing a joint manageability policy to be followed in subsequent communications between the first and second wireless devices.

21. The article of claim 20, wherein said operations further comprise forming an association between the first and second wireless devices subsequent to said transmitting the first message.

22. The article of claim 20, wherein said operations further comprise forming an association between the first and second wireless devices prior to said transmitting the first message.

23. The article of claim 20, wherein said operations further comprise rejecting a requested association between the first and second wireless devices if the manageability policy of the second wireless device is unacceptable to the first wireless device.

24. The article of claim 20, wherein the manageability policy of the wireless first device comprises indicators of which of multiple manageability services may be supported by the first wireless device.

25. The article of claim 24, wherein the manageability policy of the second wireless device comprises indicators of which of the multiple manageability services may be supported by the second wireless device.

26. The article of claim 25, wherein the joint manageability policy comprises indicators of which of the multiple manageability services may be interpreted as commands and which of the multiple manageability services are to be interpreted as unsupported.

27. The article of claim 20, further comprising transmitting, from the first wireless device to the second wireless device, a fourth message including information describing a manageability policy of a third wireless device.

28. An article comprising
a machine-readable medium that contains instructions, which when executed by at least one machine result in performing operations comprising:
receiving, by a first wireless device from a second wireless device, a first message including information, including a first list of different manageability services and data indicating whether control messages associated with the different manageability services in the first list are mandatory, optional, or not supported, describing a manageability policy of the second wireless device;
transmitting, from the first wireless device to the second wireless device, a second message including information, including a second list of different manageability services and data indicating whether control messages associated with the different manageability services in the second list are mandatory, optional, or not supported, describing a manageability policy of the first wireless device; and
receiving, by the first wireless device from the second wireless device, a third message including information, including a third list of different manageability services and data indicating whether control messages associated with the different manageability services in the third list are mandatory, optional, or not supported, describing a joint manageability policy to be followed in subsequent communications between the first and second wireless devices.

29. The article of claim 28, wherein said transmitting comprises transmitting an association request or a re-association request.

30. The article of claim 28, wherein said receiving a third message comprises receiving an association response or a re-association response.

31. The article of claim 28, wherein the joint manageability policy comprises information on which manageability services may be supported in subsequent communications between the first and second wireless devices.

* * * * *